Figure 1:
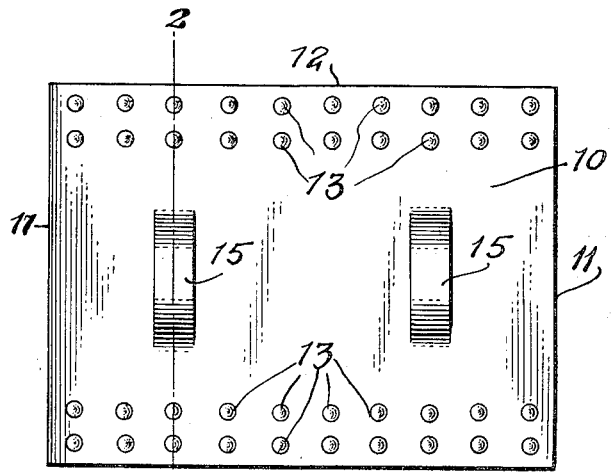

April 20, 1943.  G. A. DE GRAVELLE  2,316,855
HOSE ATTACHMENT
Filed Feb. 7, 1942  2 Sheets-Sheet 1

Inventor:
George A. DeGravelle.

By Bryant & Lowry
Attys.

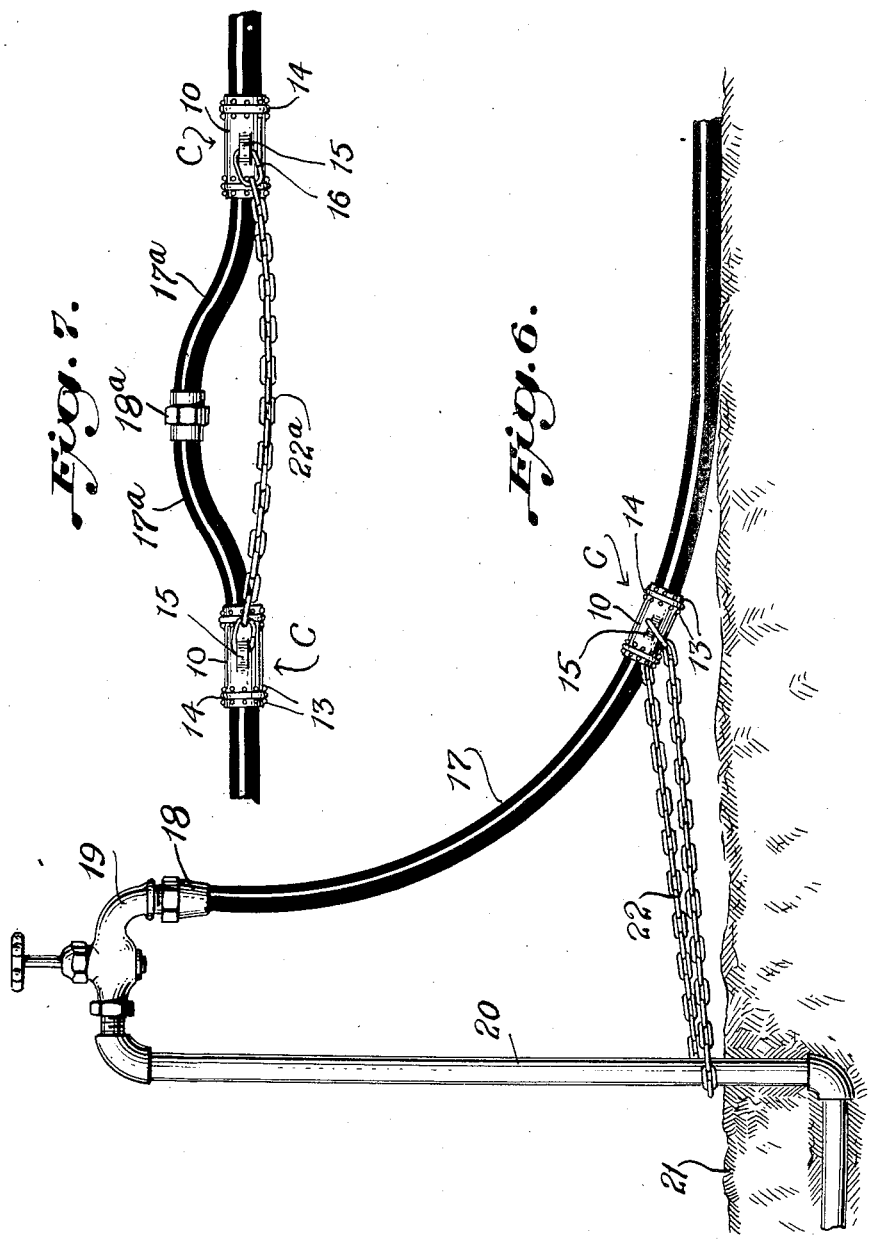

Patented Apr. 20, 1943

2,316,855

UNITED STATES PATENT OFFICE 2,316,855

HOSE ATTACHMENT

George A. De Gravelle, New Iberia, La.

Application February 7, 1942, Serial No. 429,923

5 Claims. (Cl. 285—71)

This invention relates to certain new and useful improvements in hose attachments.

In the use of garden hose and the like, it is customary to attach a hose coupling to a water supply faucet that may be carried by a stand pipe or other supply element and in the use of such garden hose during manipulation thereof and movements, undue strains are placed upon the hose coupling which frequently results in the bending or kinking of the hose in the vicinity of the coupling, the separation of the hose from the coupling, and in the breakage of the hose adjoining the coupling. It is therefore the primary object of the present invention to provide an attachment for a garden hose that is associated therewith in a manner to permit generally free movements of the hose but a restrained movement thereof in the vicinity of the coupling with a water supply to eliminate any pulling strains on the hose connection with the water supply.

Sections of hose are frequently coupled together to obtain extended lengths and such couplings between the hose sections are subjected to severe pulling strains during use of the hose and it is a further object of this invention to provide an attachment for hose sections that is associated with the adjacent ends of connected sections at opposite sides of the coupling therebetween to limit separating movements of the sections of hose and thereby relieve strain on the coupling between the hose sections.

While the invention will be herein described as an attachment for garden hose, it is to be understood that the same is adaptable for use in various arts and especially in connection with connected conduits through which air or fluid of any character flows to eliminate pulling strains on the couplings between such conduits as well as in any connection where a hose may be employed for drain or other purpose.

With the above and other objects in view that will become apparent as the nature of the invention is better understood, the same consists in the novel form, combination and arrangement of parts hereinafter more fully described, shown in the accompanying drawings and claimed.

Figure 2:
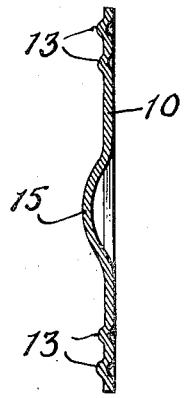
Figure 3:
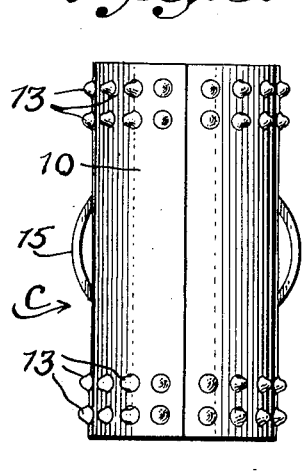
Figure 4:
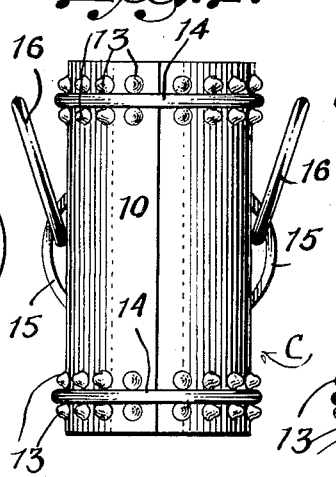
Figure 5:
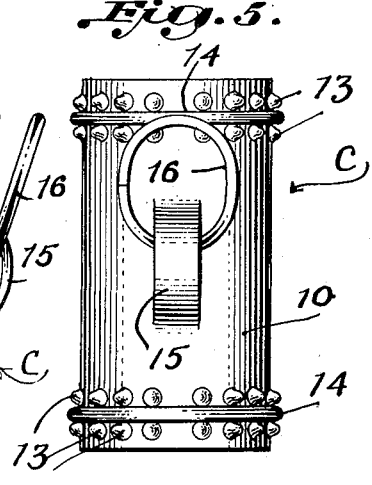

In the drawings:

Figure 1 is a developed plan view of a clamp forming a part of the hose attachment, Figure 2 is a vertical cross-sectional view taken on line 2—2 of Figure 1, showing chain attaching ears and clamping ring guard beads struck-up from the clamp plate, Figure 3 is a side elevational view showing the clamp plate of Figure 1 bent into tubular formation with the chain attaching ears thereof diametrically disposed, Figure 4 is a side elevational view, similar to Figure 3, showing the clamp plate retained in tubular formation by a clamping ring at each end thereof and with chain links engaged with the clamp plate ears, Figure 5 is a side elevational view of the hose clamp taken at right angles to the showing of the device in Figure 4, Figure 6 is an elevational view of a water stand pipe and faucet with a hose coupled to the faucet and the attachment extending between the hose and stand pipe adjacent the ground line of the latter to eliminate pulling strains on the hose coupling, and Figure 7 is a fragmentary side elevational view showing the coupled hose sections with the attachment connected to the hose sections at opposite sides of the coupling to eliminate pulling strains on the coupling.

The hose attachment comprises a tubular clamp for attachment to the hose in proximity of its water supply coupling and this tubular clamp in the formation thereof as shown by the developed plan view in Figure 1 and which will be hereinafter generally referred to by the reference character C, comprises a rectangular plate 10 formed of bendable metal, the sides edges 11 of which plate are adapted to abut each other when the plate is bent into tubular formation for inclosing and clamping engagement with a hose.

Adjacent each opposite end 12 of the plate 10, there is provided two parallel rows of spaced struck-up beads 13 which when the plate 10 is bent or folded into tubular formation as shown in Figures 4 and 5 provide retaining guides for clamping rings 14 to retain the plate in tubular formation for use as a hose clamp C.

As shown in Figures 1 and 2, a pair of link chain attaching ears 15 are struck up from the plate 10 on the median line of the plate between the side edges 11 thereof, and when the plate is folded into tubular formation for use as a hose clamp these link chain attaching ears 15 are diametrically disposed relative to the hose clamp C as shown in Figures 3 and 4 for the attachment of rings or the like 16 to which a link chain is attached.

When the device is to be used as an attachment for garden hose as shown in Figure 6, the hose 17 has the coupling 18 at one end thereof attached to the water supply bibb or faucet 19 carried by the upper end of a stand pipe 20 rising from the ground line 21. In securing the clamp C to the hose 17, the plate formation 10 thereof, as shown in Figure 1, is bent around the hose to assume the formation shown in Figure 3 and the clamping rings 14 are then moved into position between the rows of retainer beads 13 as shown in Figures 4 and 5. These rings 14 may be of the split type to be engaged with the hose and clamp, or they may be continuous rings and placed upon the hose prior to attachment of the hose to the water supply faucet 19. In the use of such garden hose, the same when of considerable length is moved over a lawn or field generally without regard to pulling strains on the coupling 18, and to eliminate such pulling strains the restricting link chain 22 has the intermediate portion thereof pased around the stand pipe 20 with one end of the chain attached to a ring 16 at one side of the clamp C while the other end of the chain has a conventional snap hook connection with the diametrically opposite ring 16 in the clamp. The hose clamp C is secured to the hose 17 against sliding movements by the retainer rings 14 forcing the clamp into compressive contact with the hose and it will be understood from an inspection of Figure 6 that any pulling action on the hose will be limited by the chain connection between the clamp and stand pipe and thereby eliminate any pulling action or strains on the coupling 18. In the use of the hose attachment where a water supply faucet extends through the side wall of the building and in the absence of the stand pipe 20, the chain 22 may be secured to a ground anchored pin or other stationary object adjacent the faucet 19, so that the section of the hose 17 between the clamp C and its faucet is prevented from movement relative to the faucet and especially with reference to any movements that would impart pulling strains on the coupling 18.

To increase the length of hose, sections are connected together, and as shown in Figure 7, two hose sections 17a are joined by a coupling 18a. To relieve the coupling 18a of any pulling strains, a hose clamp C is attached to each hose section 17a in the general vicinity of the coupling 18a and these clamps C are connected together by a chain 22a and the slight flexure in the coupled hose ends is restrained from straining movements by the chain-connected hose clamps.

From the above detailed description of the invention, it is believed that the construction and use thereof will at once be apparent, and while there are herein shown and described the preferred embodiments of the invention, it is nevertheless to be understood that minor changes may be made therein without departing from the spirit and scope of the invention as claimed.

I claim:

1. In a hose attachment, wherein a hose is coupled at one end to a fluid supply, a tubular clamp attached to the hose in spaced relation to the coupling and anchor means associated with the clamp for restraining movements of the hose between the clamp and coupling whereby pulling strains on the coupling are eliminated, said clamp including a longitudinally split sleeve, circumferential rows of beads struck-up from the sleeve adjacent each end, a retainer ring between the adjacent rows of beads and ears struck-up from the clamp for the attachment of the anchor means.

2. Means to prevent separation of a hose and its coupling fitting when the fitting is attached to a coupling, comprising a sleeve element adjustably attached to a hose and having means spanning the coupling joint and anchored on both sides of the joint so as to maintain slack in the spanned portion of the hose for preventing substantial separation strains between the hose and its coupling fitting.

3. A structure as set forth in claim 2, wherein the sleeve element comprises a longitudinally split sleeve, means for retaining the sleeve in tubular formation and clampingly engaged with the hose, and the anchoring of the sleeve comprising a flexible member attached to the sleeve and anchored in spaced relation to the clamp.

4. A structure as set forth in claim 2, wherein the coupling comprises a faucet to which the coupling fitting is attached, and said means comprising a chain.

5. A structure as set forth in claim 2, wherein the coupling comprises a pair of hose sections with their fittings connected together and said means being anchored to the two hose sections at opposite sides of the coupling.

GEORGE A. DE GRAVELLE.